US007984286B2

(12) United States Patent
Zimmer et al.

(10) Patent No.: US 7,984,286 B2
(45) Date of Patent: Jul. 19, 2011

(54) APPARATUS AND METHOD FOR SECURE BOOT ENVIRONMENT

(75) Inventors: Vincent J. Zimmer, Federal Way, WA (US); Mohan Kumar, Aloha, OR (US); Mahesh Natu, Portland, OR (US); Qin Long, Shanghai (CN); Liang Cui, Shanghai (CN); Jiewen Yao, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 600 days.

(21) Appl. No.: 12/215,071

(22) Filed: Jun. 25, 2008

(65) Prior Publication Data

US 2009/0327684 A1 Dec. 31, 2009

(51) Int. Cl.
*G06F 15/177* (2006.01)
*H04L 9/32* (2006.01)
(52) U.S. Cl. ............ 713/2; 713/155; 713/176; 713/187
(58) Field of Classification Search .................. 713/1, 2, 713/155, 176, 187
See application file for complete search history.

(56) References Cited

U.S. PATENT DOCUMENTS

| 6,625,729 B1 * | 9/2003 | Angelo et al. ............... 713/2 |
| 6,925,570 B2 * | 8/2005 | Freeman et al. ............ 713/323 |
| 7,200,758 B2 * | 4/2007 | Zimmer ..................... 713/192 |
| 2004/0193865 A1 * | 9/2004 | Nguyen et al. .............. 713/2 |
| 2006/0021064 A1 * | 1/2006 | England et al. ............. 726/27 |

* cited by examiner

*Primary Examiner* — Thuan N Du
(74) *Attorney, Agent, or Firm* — Paul E. Steiner (57) ABSTRACT

In some embodiments, a processor-based system may include at least one processor, at least one memory coupled to the at least one processor, a boot block stored at a first memory location, a capsule update stored at a second memory location, a startup authenticated code module to ensure the integrity of the boot block upon a restart of the processor-based system, code which is executable by the processor-based system to cause the processor-based system to validate the boot block with the startup authenticated code module upon the restart of the processor-based system, and, if the boot block is successfully validated, to validate the capsule update for the processor-based system with the startup authenticated code module. Other embodiments are disclosed and claimed.

20 Claims, 6 Drawing Sheets

APPARATUS AND METHOD FOR SECURE BOOT ENVIRONMENT

RELATED APPLICATIONS

This application is related to U.S. patent application Ser. No. 11/965,295 entitled "FIRMWARE INTEGRITY VERIFICATION" filed on Dec. 27, 2007. (still pending)

TECHNICAL FIELD

The invention relates to secure boot environments. More particularly, some embodiments of the invention relate to an apparatus and method for allowing hardware-reset time firmware authentication or authorization.

BACKGROUND AND RELATED ART

Intel® trusted execution technology for safer computing, code named LaGrande Technology (LT), is a versatile set of hardware extensions to Intel® processors and chipsets that enhances any personal computer (PC) platform (for example, the digital office platform) with security capabilities such as measured launch and protected execution. LT is a component of the Intel safer computing initiative, and was first introduced in client platforms. Intel trusted execution technology provides hardware-based mechanisms that help protect against software-based attacks and protects the confidentiality and integrity of data (for example, passwords, keys, etc.) stored or created on a personal computer (PC).

Better protection is achieved by enabling an environment where applications can run within their own space, protected from all other software on the system. These capabilities provide the protection mechanisms, rooted in hardware, that are necessary to provide trust in the application's execution environment and help protect vital data and processes from being compromised by malicious software running on a platform.

In Intel trusted execution technology control flow, a VMM (Virtual Machine Monitor) loader launches an Intel signed module which is presented with the cryptographic measurement of the platform firmware code (and/or platform Basic Input/Output System (BIOS) code). This module contains what is known as a launch control policy (LCP) engine. This policy engine compares this measurement with what is recorded in a policy data structure and communicates to the VMM the security "goodness" of the BIOS firmware. The VMM gets to choose whether to trust the measured platform BIOS code or not. If it trusts the BIOS code, it will launch a secure environment.

BRIEF DESCRIPTION OF THE DRAWINGS

Various features of the invention will be apparent from the following description of preferred embodiments as illustrated in the accompanying drawings, in which like reference numerals generally refer to the same parts throughout the drawings. The drawings are not necessarily to scale, the emphasis instead being placed upon illustrating the principles of the invention.

DESCRIPTION

In the following description, for purposes of explanation and not limitation, specific details are set forth such as particular structures, architectures, interfaces, techniques, etc. in order to provide a thorough understanding of the various aspects of the invention. However, it will be apparent to those skilled in the art having the benefit of the present disclosure that the various aspects of the invention may be practiced in other examples that depart from these specific details. In certain instances, descriptions of well known devices, circuits, and methods are omitted so as not to obscure the description of the present invention with unnecessary detail.

Figure 1:
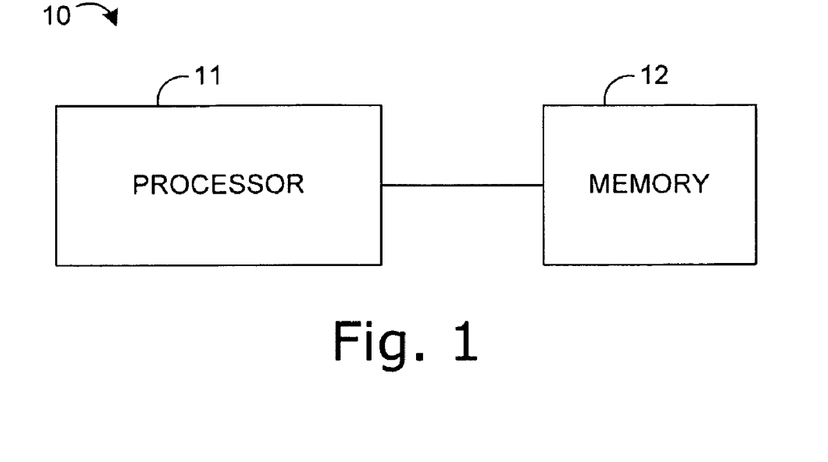
FIG. 1 is a block diagram of an electronic system in accordance with some embodiments of the invention.

With reference to FIG. 1, in accordance with some embodiments of the invention a processor-based system 10 may include at least one processor 11 and at least one memory 12 coupled to the at least one processor. For example, the system 10 may include a boot block stored at a first memory location, a capsule update stored at a second memory location, a startup authenticated code module to ensure the integrity of the boot block upon a restart of the processor-based system 10, code which is executable by the processor-based system 10 to cause the processor-based system 10 to validate the boot block with the startup authenticated code module upon the restart of the processor-based system 10, and if the boot block is successfully validated, to validate the capsule update for the processor-based system 10 with the startup authenticated code module.

For example, in some embodiments of the system 10, the code to validate the capsule update for the processor-based system 10 with the startup authenticated code module may include code to utilize the startup authenticated code module to check a register for the capsule update, and, if the capsule update is found at the register, perform an integrity check on the capsule update using the startup authenticated code module to validate the capsule update. For example, the code may further include code to, if the startup authenticated code module determines that the capsule update fails the integrity check, overwrite pages of the capsule update. For example, the overwritten pages of the capsule update may be zeroed.

For example, in some embodiments of the system 10, the code may further include code to perform the capsule update using the startup authenticated code module. For example, in some embodiments of the system 10, the code may further include code to provide an entry point into the startup authenticated code module that is accessible by platform initialization firmware, receive a public key and digest from the platform initialization firmware via the entry point, and validate a signature based on the public key and digest received from the platform initialization firmware using the startup authenticated code module.

Figure 2:
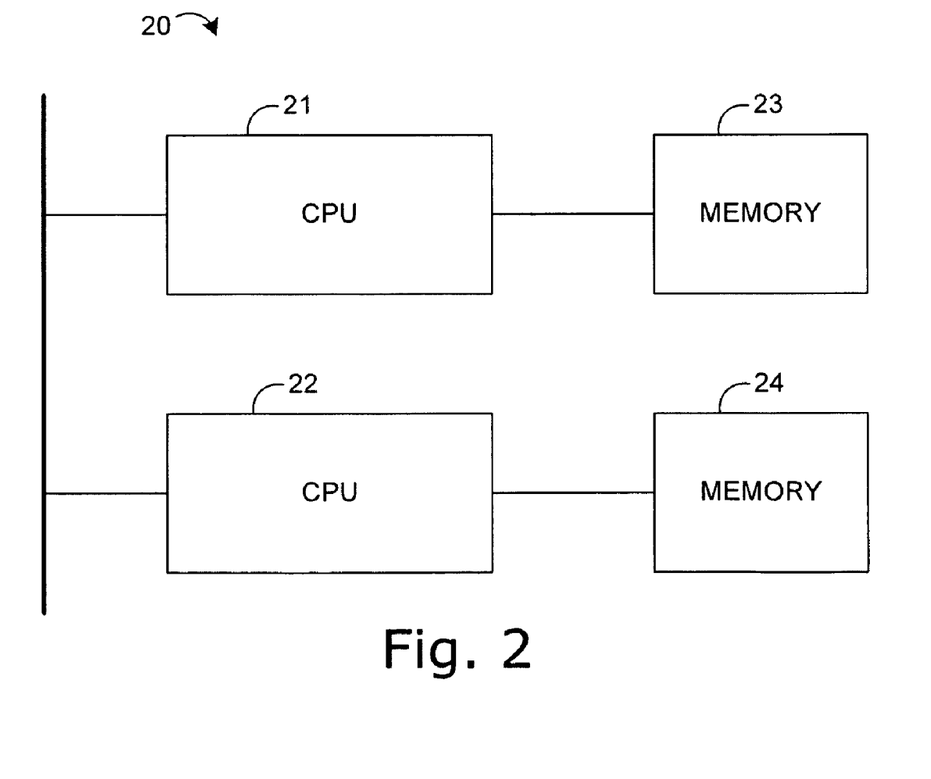
FIG. 2 is a block diagram of another electronic system in accordance with some embodiments of the invention.

With reference to FIG. 2, a processor-based system 20 may include at least one processor (e.g. central processor units (CPUs) 21 and 22) and at least one memory coupled to the at least one processor (e.g. memories 23 and 24 respectively coupled to CPUs 21 and 22). For example, the system 20 may include a boot block stored at a first memory location, a startup authenticated code module to authenticate the boot block, code which is executable by the processor-based system 20 to cause the processor-based system 20 to authenticate the boot block using the startup authenticated code module during restart of the processor-based system 20, if the boot block is successfully authenticated using the startup authenticated code module, to authorize an additional firmware element outside the boot block using an authenticated code module during restart of the processor-based system 20, and, if the additional firmware element is successfully authorized using the authenticated code module, to maintain the authorization using a platform initialization image authorization during restart of the processor-based system 20.

For example, in some embodiments of the system 20, the code to authorize the additional firmware element outside the boot block using the authenticated code module may include code to initialize system management memory, load platform manufacturer code for the additional firmware element into the system management memory, load platform manufacturer data for the additional firmware element into the system management memory, load a security key corresponding to the platform manufacturer code and the platform manufacturer data for the additional firmware element into the system management memory, perform an integrity test on the platform manufacturer code and the platform manufacturer data using the security key, and, if the integrity test is successful, register the platform manufacturer code in a dispatch table.

For example, in some embodiments of the system 20, the code may further include code to, if the integrity test fails, lock the system management memory. For example, in some embodiments of the system 20 the additional firmware element may include one of a reliability-availability-serviceability (RAS) element, a system management mode (SMM) element, and a Quick Path Interconnect (QPI) (e.g. a point-to-point) routing element.

Figure 3:
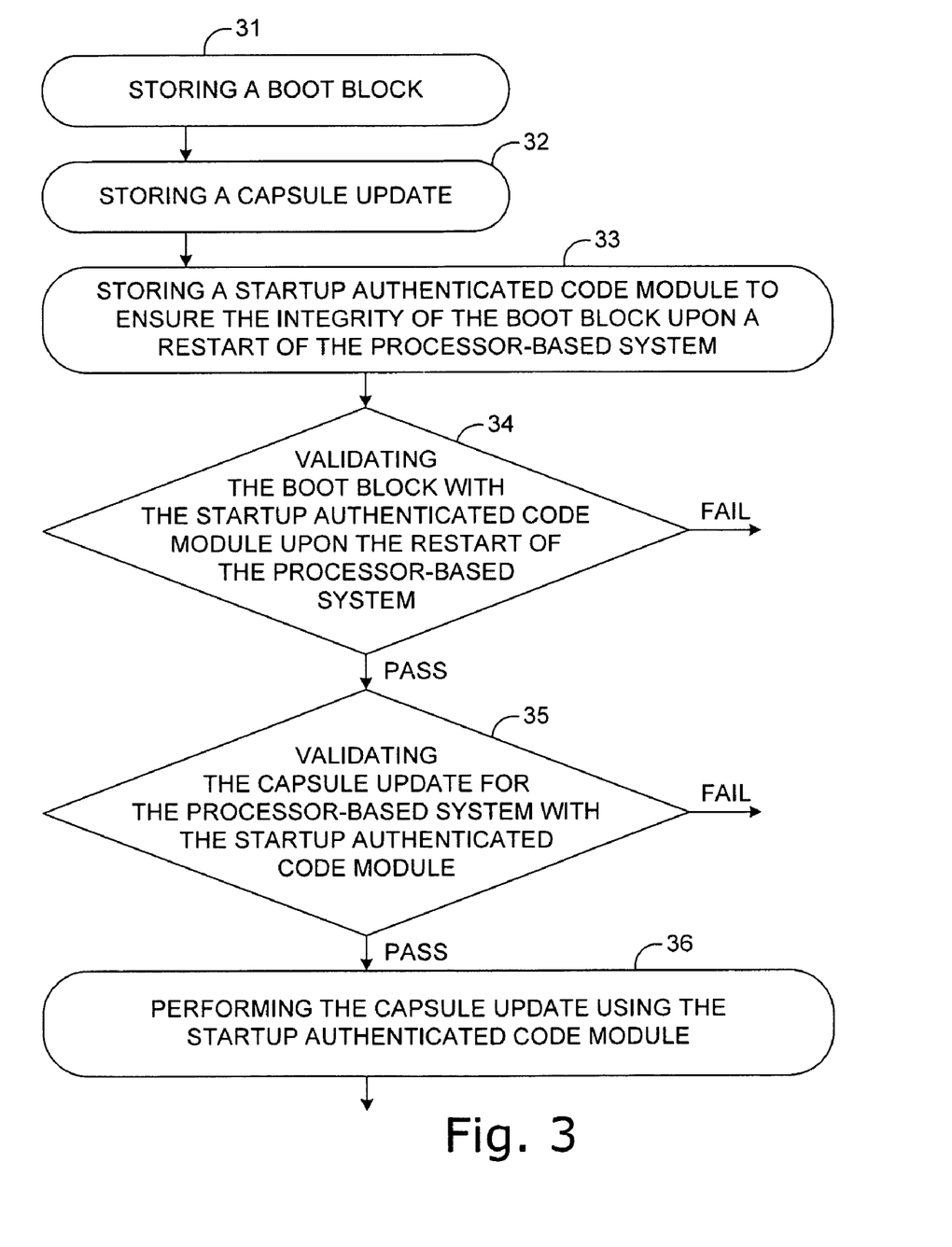
FIG. 3 is a flow diagram in accordance with some embodiments of the invention.

With reference to FIG. 3, in accordance with some embodiments of the invention, authenticating a capsule update for a processor-based system may include storing a boot block (e.g. block 31), storing a capsule update (e.g. block 32), storing a startup authenticated code module to ensure the integrity of the boot block upon a restart of the processor-based system (e.g. block 33), validating the boot block with the startup authenticated code module upon the restart of the processor-based system (e.g. block 34), and, if the boot block is successfully validated, validating the capsule update for the processor-based system with the startup authenticated code module (e.g. block 35). For example, some embodiments of the invention may further include performing the capsule update using the startup authenticated code module (e.g. block 36).

Figure 4:
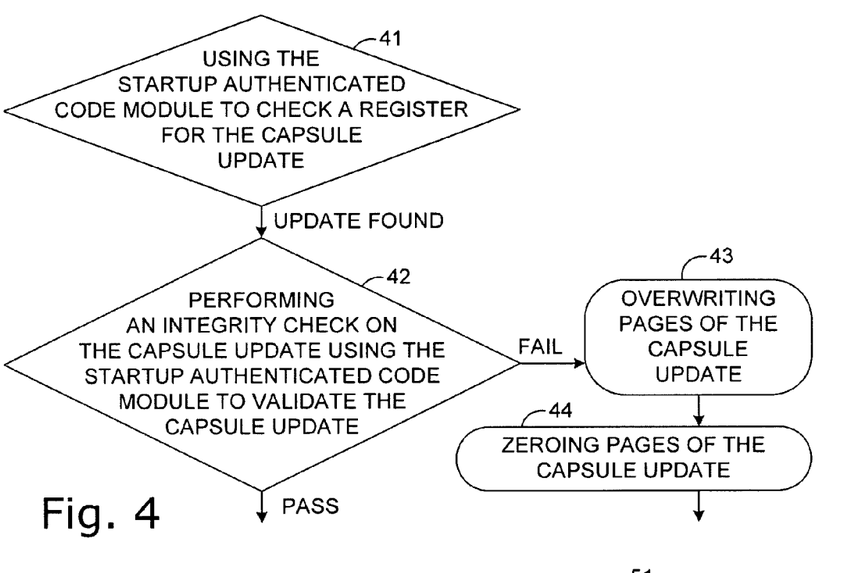
FIG. 4 is another flow diagram in accordance with some embodiments of the invention.

With reference to FIG. 4, in accordance with some embodiments of the invention, validating the capsule update for the processor-based system with the startup authenticated code module may include using the startup authenticated code module to check a register for the capsule update (e.g. block 41), and, if the capsule update is found at the register, performing an integrity check on the capsule update using the startup authenticated code module to validate the capsule update (e.g. block 42). For example, some embodiments of the invention may further include, if the startup authenticated code module determines that the capsule update fails the integrity check, overwriting pages of the capsule update (e.g. block 43). For example, overwriting pages of the capsule update may include zeroing pages of the capsule update (e.g. block 44).

Figure 5:
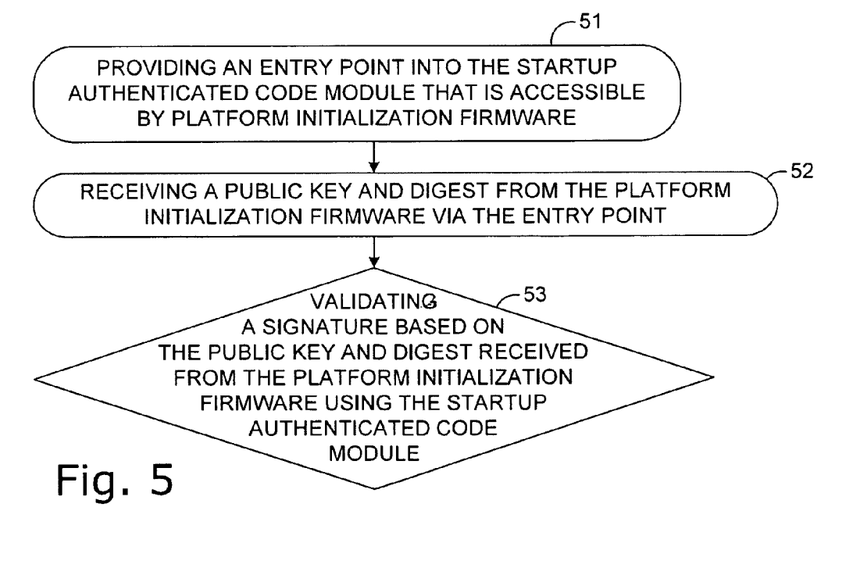
FIG. 5 is another flow diagram in accordance with some embodiments of the invention.

With reference to FIG. 5, some embodiments of the invention may include providing an entry point into the startup authenticated code module that is accessible by platform initialization firmware (e.g. block 51), receiving a public key and digest from the platform initialization firmware via the entry point (e.g. block 52), and validating a signature based on the public key and digest received from the platform initialization firmware using the startup authenticated code module (e.g. block 53).

Figure 6:
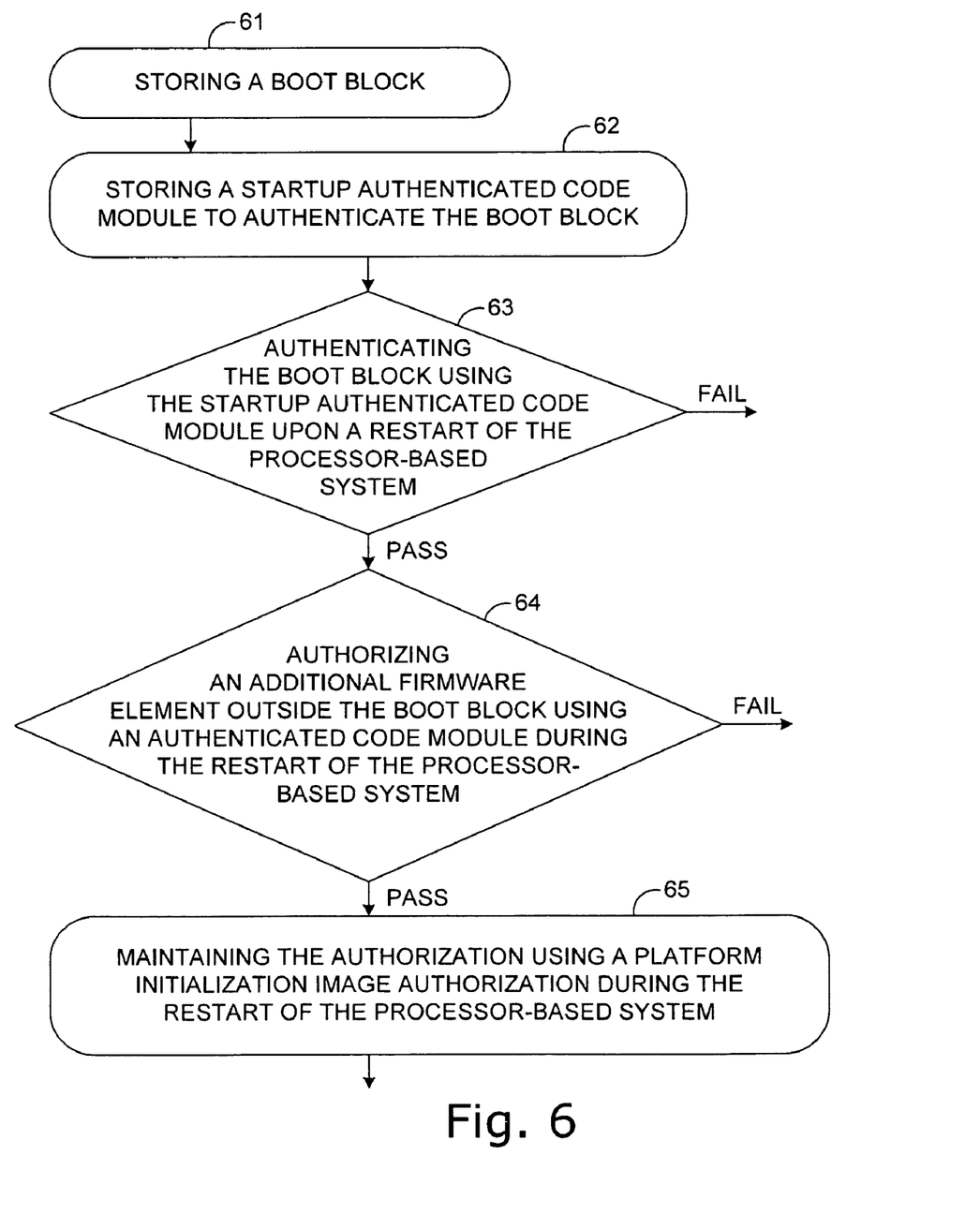
FIG. 6 is another flow diagram in accordance with some embodiments of the invention.

With reference to FIG. 6, in accordance with some embodiments of the invention, booting a processor-based system may include storing a boot block (e.g. block 61), storing a startup authenticated code module to authenticate the boot block (e.g. block 62), authenticating the boot block using the startup authenticated code module upon a restart of the processor-based system (e.g. block 63), if the boot block is successfully authenticated using the startup authenticated code module, authorizing an additional firmware element outside the boot block using an authenticated code module during the restart of the processor-based system (e.g. block 64), and, if the additional firmware element is successfully authorized using the authenticated code module, maintaining the authorization using a platform initialization image authorization during the restart of the processor-based system (e.g. block 65).

Figure 7:
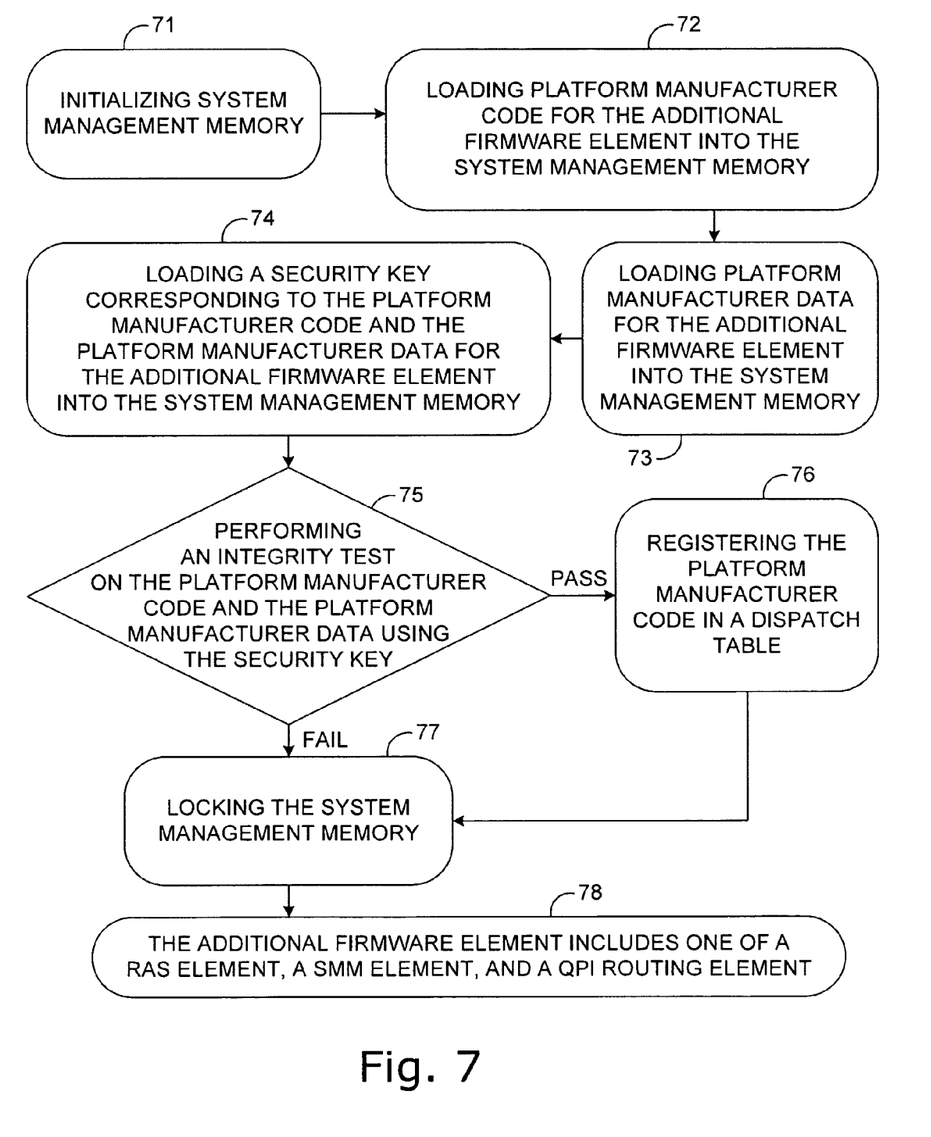
FIG. 7 is another flow diagram in accordance with some embodiments of the invention.

With reference to FIG. 7, in some embodiments of the invention authorizing the additional firmware element outside the boot block using the authenticated code module may include, for example, initializing system management memory (e.g. block 71), loading platform manufacturer code for the additional firmware element into the system management memory (e.g. block 72), loading platform manufacturer data for the additional firmware element into the system management memory (e.g. block 73), loading a security key corresponding to the platform manufacturer code and the platform manufacturer data for the additional firmware element into the system management memory (e.g. block 74), performing an integrity test on the platform manufacturer code and the platform manufacturer data using the security key (e.g. block 75), and, if the integrity test is successful, registering the platform manufacturer code in a dispatch table (e.g. block 76). For example, some embodiments of the invention may further include, if the integrity test fails, locking the system management memory (e.g. block 77). For example, the additional firmware element may include one of a reliability-availability-serviceability (RAS) element, a system management mode (SMM) element, and a QPI routing element (e.g. block 78).

In some embodiments, for example, additional capabilities may be added to the trusted execution technology. For example, a server version of Intel® trusted execution technology may be referred to as LaGrande Technology with Server Extensions (LT-SX). Some versions can be implemented that use a security model that allows RAS (Reliability, Availability, and Serviceability) features to coexist with security features. For example, some embodiments of the invention may provide techniques by which the hardware Core Root of Trust for Measurement (CRTM) can be used to authenticate Unified Extensible Firmware Interface (UEFI— www.uefi.org) signed capsule updates. Some vendors may perform install-time checking of BIOS updates, which entails firmware in the ROM checking the integrity of an update. A problem is that even with a Read-Only CRTM in the platform flash to perform this checking, these schemes may be vulnerable to flash-swap attacks. Advantageously, some embodiments of the invention may mitigate flash-swap and/or early-boot malware by utilizing the Startup Authenticated Code Module (StartupACM) to validate the integrity of a capsule update.

For example, a capsule may be a set of data pages that have been sent to the firmware across a CPU-only reset from some Operating System (OS)-hosted environment. Upon passing control back to firmware, the flash part becomes unlocked and the early firmware, such as CRTM (Core Root of Trust for Measurement) is the code signing guard to validate the capsule contents. Trust is implicit in this early BIOS code to do its job.

Advantageously, some embodiments of the invention may utilize the StartupACM component to perform a new, different function. For example, the previously understood function of the StartupACM may have been to validate the data-at-rest in the ROM/boot-block upon each restart. In accordance with some embodiments of the invention, an augmented, new function of the StartupACM may be to validate a capsule update.

For example, the StartupACM may perform a new function to check LT public space registers for a capsule update, validate the capsule update, and zero-ize the capsule pages if the integrity check fails. For example, the StartupACM may utilize the LT scratch registers as pointers to the capsule's scatter gather list and authenticate the capsules found at the pointer locations. Advantageously, because the StartupACM becomes the code-signing guard instead of potentially less secure macrocode in the flash, the chipset/firmware interface table (FIT) boot binding of the ACM to the platform may help ensure that a flash-swap attack does not usurp the code-signing guard role.

In some embodiments of the invention, a further extension may be to not only have the StartupACM authenticate the candidate capsule update but to also effect the update. Advantageously, flash writes to the flash that stores the SMM and RAS code maybe qualified by the ACM locality. Advantageously, in some embodiments the ACM could be the entire secure update agent, versus working with other update agents in the platform code. Advantageously, some embodiments of the invention may take a significant step to providing a true secure boot architecture, a feature long desired by OS vendors, by guaranteeing or increasing the likelihood of successfully passing of control from the OEM firmware/BIOS into the OS.

RSA is a well known algorithm for public-key cryptography. In addition to a new role for checking for capsule updates immediately upon reset, in some embodiments of the invention the StartupACM RSA signature checking capability may be exposed via an additional entry point into the ACM. For example, this second entry point may take a public key and a digest. Advantageously, the ACM may then be multiply-invoked by the UEFI Platform Initialization (PI) firmware so that instead of having two instances of RSA code in the system, the PI firmware may re-use the ACM.

In accordance with some embodiments of the invention, the hardware Core Root of Trust for Measurement (CRTM) may be inductively extended into UEFI Platform Initialization (PI) image authorization. For example, securely booting various platform drivers, such as SMM, RAS, and QPI. This inductive chain entails authorization of initial firmware elements with ACM's and maintaining the authorization via UEFI PI image authorization. One problem with complex platforms is that a relatively large number of secure drivers may require a relatively large boot block. Some embodiments of the invention solve this problem by including additional firmware elements into the trusted computing base (TCB) without adding the additional firmware elements to the boot block. Advantageously, some embodiments of the invention may provide tightly bound security features while reducing the size requirement for the boot block. For example, some embodiments of the invention may complement LT-SX by utilizing the hardware CRTM of SX with a modular-based UEFI firmware deployment. From a hardware perspective, LT-SX may create a mechanism to ensure that initial firmware in the TCB is authorized. For example, some embodiments of the invention may construct code in SMM has appropriate authorization and locking. Some embodiments of the invention may provide a runtime check, which can be complemented by additional techniques for install-time checks (e.g., signed capsule updates as described above).

The Trusted Platform Module (TPM) and the techniques promulgated by the Trusted Computing Group (www.trustedcomputinggroup.org) may entail the use of the TPM as a Root-of-Trust for Storage (RTS) and Reporting (RTR) via the Platform Configuration Registers (PCR's) and Storage Root Key (SRK), respectively. The platform microcode, via invocation of the Startup Authenticated Code Module (StartupACM) may be the Core Root of Trust for Measurement (CRTM). The StartupACM, along with a Launch-Control Policy (LCP) or build-in policy, can validate the boot block of the system. Some vendors may want a relatively small boot block size in order to have a relatively small fault-tolerant updatable component. The StartupACM and the boot-block (for example, with a PI implementation including the Pre-EFI Initialization (PEI) phase and the recovery firmware volume), may constitute the initial trusted computing base (TCB).

For example, in accordance with some embodiments of the invention, a secure boot may pick up from the initial image authorized by StartupACM, the UEFI Platform Initialization (PI), Pre-EFI Initialization (PEI), and Driver Execution Environment (DXE), and thereafter add a firmware a Root of Trust for Enforcement of Validation (RTE/RTV). The RTE/RTV may enable the secure boot of subsequent components. These subsequent components can include, for example, Reliability-Availability-Serviceability (RAS), PI System Management Mode (SMM), the SMM core, and QPI routing drivers, among other components. Essentially, in some embodiments, the StartupACM+LCP may ensure that PEI+DXE (e.g. an example UEFI Implementation) is correct, and then the PEI+DXE may implement a root-of-trust-for-verification (RTV) and help ensure that subsequent drivers are authorized (e.g., check the digital signatures of the subsequent drivers).

Whereas CRTM may record state and continue execution irrespective of the measurement, an RTE and secure boot may stop the boot if the software state does not meet some integrity metric, such as, for example, a hash in a white-list or a digital signature. For example, UEFI may support both cases but the digital signature may be preferred because it may be considered to be more manageable. For example, public keys may allow for a level of indirection to map the keys to a few trusted sources, thus easing some management problems associated with deployment. For example, in contrast to public keys, white-lists based upon hashes may grow to a less readily manageable number of values as updates to components lead to further hashes to be added to the white-list.

Figure 8:
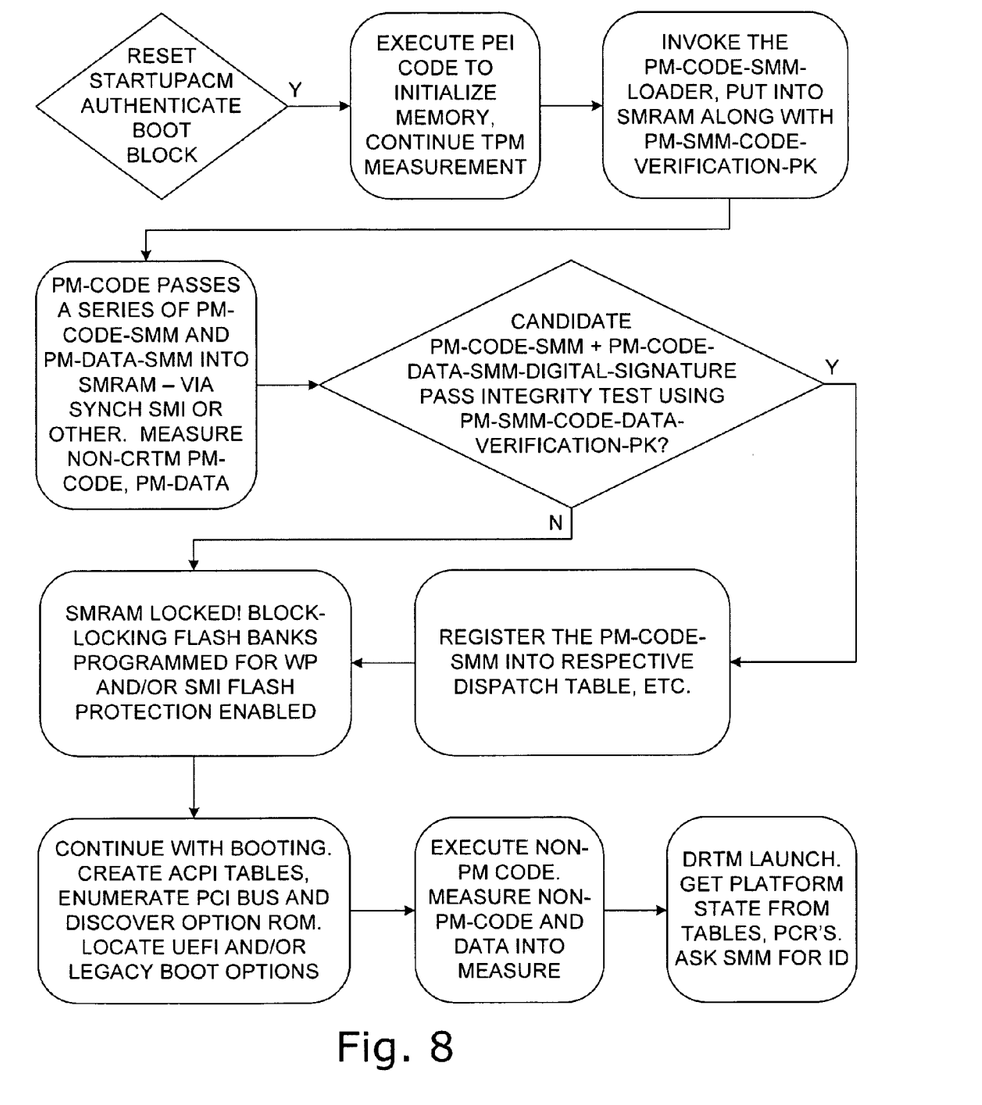
FIG. 8 is another flow diagram in accordance with some embodiments of the invention.

With reference to FIG. 8, the PM-code and PM-data correspond to Platform Manufacturer code and data, respectively. For example, PM is a neutral term adopted by the Trusted Computing Group (TCG) DRTM Working Group in order to generalize the traditional Original Equipment Manufacturer's (OEM's) role. In accordance with some embodiments of the invention, securely booting a platforms may include resetting the platform and authenticating the boot block with the StartupACM (e.g. block 80), executing the PEI code to initialize memory and continuing the TPM measurement (e.g. block 81), invoking the PM-code-SMM-loader and putting it into SMRAM along with a PM-SMM-code-verification-PK (e.g. block 82), passing a series of PM-code-SMM and PM-data-SMM into SMRAM (e.g. with the PM-code via synch SMI or other) and measuring non-CRTM PM-code and PM-data (e.g. block 83), performing an integrity test on the candidate PM-code-SMM+PM-code-data-SMM-digital-signature using PM-SMM-code-data-verification-PK (e.g. block 84), registering the PM-code-SMM into respective dispatch table, etc. if the integrity test is passed (e.g. block 85), and locking the SMRAM if the integrity test is failed and block-locking flash banks programmed for WP and/or SMI flash protection enabled (e.g. block 86). Some embodiments may continue with booting, create ACPI tables, enumerate the PCI bus and discover option ROM, locate UEFI and/or legacy boot options (e.g. block 87), execute non-PM code, measure non-PM-code and data into measure (e.g. block 88), and perform the DRTM launch, get platform state from tables, PCR's, etc. and ask SMM for ID (e.g. block 89).

As noted above, the initial, ACM-authenticated ROM may be too small to store all of the firmware components that are desired to be in the TCB (e.g. the QPI SMM RAS drivers, etc). Advantageously, some embodiments of the invention may provide additional extensions for LT-SX to extend the trust from the initial codes into the UEFI PI SMM driver launch, for example.

Although many of the embodiments described herein utilize terminology associated with the Intel trusted execution environment, those skilled in the art will appreciate that the invention is not limited to these specific embodiments and that equivalent routines and/or structures may be implemented in other processor-based environments where security features are desired. For example, a startup authenticated code module may correspond to any type of authenticated code which is invoked substantially immediately upon restart of a processor-based system (or otherwise very early in the boot process). Likewise, the various code modules, registers, and tables referred to herein may be described by other terminology in other platforms while providing equivalent structures and/or performing equivalent functions.

Those skilled in the art will appreciate that, given the benefit of the present description, a numerous variety of other circuits and combinations of hardware and/or software may be configured to implement various methods, circuits, and systems in accordance with the embodiments described herein and other embodiments of the invention. The examples of FIGS. 1 through 8 are non-limiting examples of suitable embodiments.

The foregoing and other aspects of the invention are achieved individually and in combination. The invention should not be construed as requiring two or more of such aspects unless expressly required by a particular claim. Moreover, while the invention has been described in connection with what is presently considered to be the preferred examples, it is to be understood that the invention is not limited to the disclosed examples, but on the contrary, is intended to cover various modifications and equivalent arrangements included within the spirit and the scope of the invention.

What is claimed is:

1. A processor-based system, comprising:
   at least one processor;
   at least one memory coupled to the at least one processor;
   a boot block stored at a first memory location;
   a capsule update stored at a second memory location;
   a startup authenticated code module to ensure the integrity of the boot block upon a restart of the processor-based system;
   code which is executable by the processor-based system to cause the processor-based system to validate the boot block with the startup authenticated code module upon the restart of the processor-based system; and
   if the boot block is successfully validated, to validate the capsule update for the processor-based system with the startup authenticated code module.

2. The system of claim 1, wherein the code to validate the capsule update for the processor-based system with the startup authenticated code module comprises code to:
   utilize the startup authenticated code module to check a register for the capsule update; and
   if the capsule update is found at the register, perform an integrity check on the capsule update using the startup authenticated code module to validate the capsule update.

3. The system of claim 2, the code further comprising code to:
   if the startup authenticated code module determines that the capsule update fails the integrity check, overwrite pages of the capsule update.

4. The system of claim 3, wherein the overwritten pages of the capsule update are zeroed.

5. The system of claim 1, the code further comprising code to:
   perform the capsule update using the startup authenticated code module.

6. The system of claim 1, the code further comprising code to:
   provide an entry point into the startup authenticated code module that is accessible by platform initialization firmware;
   receive a public key and digest from the platform initialization firmware via the entry point; and
   validate a signature based on the public key and digest received from the platform initialization firmware using the startup authenticated code module.

7. A processor-based system, comprising:
   at least one processor;
   at least one memory coupled to the at least one processor;
   a boot block stored at a first memory location;
   a startup authenticated code module to authenticate the boot block;
   code which is executable by the processor-based system to cause the processor-based system to:
   authenticate the boot block using the startup authenticated code module during restart of the processor-based system;
   if the boot block is successfully authenticated using the startup authenticated code module, authorize an additional firmware element outside the boot block using an authenticated code module during restart of the processor-based system; and
   if the additional firmware element is successfully authorized using the authenticated code module, maintain the authorization using a platform initialization image authorization during restart of the processor-based system.

8. The system of claim 7, wherein the code to authorize the additional firmware element outside the boot block using the authenticated code module comprises code to:
   initialize system management memory;
   load platform manufacturer code for the additional firmware element into the system management memory;

load platform manufacturer data for the additional firmware element into the system management memory;
load a security key corresponding to the platform manufacturer code and the platform manufacturer data for the additional firmware element into the system management memory;
perform an integrity test on the platform manufacturer code and the platform manufacturer data using the security key; and
if the integrity test is successful, register the platform manufacturer code in a dispatch table.

9. The system of claim 8, the code further comprising code to:
if the integrity test fails, lock the system management memory.

10. The system of claim 9, wherein the additional firmware element includes one of a reliability-availability-serviceability (RAS) element, a system management mode (SMM) element, and a Quick Path Interconnect (QPI) routing element.

11. A method of authenticating a capsule update for a processor-based system, comprising:
storing a boot block;
storing a capsule update;
storing a startup authenticated code module to ensure the integrity of the boot block upon a restart of the processor-based system;
validating the boot block with the startup authenticated code module upon the restart of the processor-based system; and
if the boot block is successfully validated, validating the capsule update for the processor-based system with the startup authenticated code module.

12. The method of claim 11, wherein validating the capsule update for the processor-based system with the startup authenticated code module comprises:
using the startup authenticated code module to check a register for the capsule update; and
if the capsule update is found at the register, performing an integrity check on the capsule update using the startup authenticated code module to validate the capsule update.

13. The method of claim 12, further comprising:
if the startup authenticated code module determines that the capsule update fails the integrity check, overwriting pages of the capsule update.

14. The method of claim 13, wherein overwriting pages of the capsule update comprises zeroing pages of the capsule update.

15. The method of claim 11, further comprising:
performing the capsule update using the startup authenticated code module.

16. The method of claim 11, further comprising:
providing an entry point into the startup authenticated code module that is accessible by platform initialization firmware;
receiving a public key and digest from the platform initialization firmware via the entry point; and
validating a signature based on the public key and digest received from the platform initialization firmware using the startup authenticated code module.

17. A method for booting a processor-based system, comprising:
storing a boot block;
storing a startup authenticated code module to authenticate the boot block;
authenticating the boot block using the startup authenticated code module upon a restart of the processor-based system;
if the boot block is successfully authenticated using the startup authenticated code module, authorizing an additional firmware element outside the boot block using an authenticated code module during the restart of the processor-based system; and
if the additional firmware element is successfully authorized using the authenticated code module, maintaining the authorization using a platform initialization image authorization during the restart of the processor-based system.

18. The method of claim 17, wherein authorizing the additional firmware element outside the boot block using the authenticated code module comprises:
initializing system management memory;
loading platform manufacturer code for the additional firmware element into the system management memory;
loading platform manufacturer data for the additional firmware element into the system management memory;
loading a security key corresponding to the platform manufacturer code and the platform manufacturer data for the additional firmware element into the system management memory;
performing an integrity test on the platform manufacturer code and the platform manufacturer data using the security key; and
if the integrity test is successful, registering the platform manufacturer code in a dispatch table.

19. The method of claim 18, further comprising:
if the integrity test fails, locking the system management memory.

20. The method of claim 19, wherein the additional firmware element includes one of a reliability-availability-serviceability (RAS) element, a system management mode (SMM) element, and a Quick Path Interconnect (QPI) routing element.

* * * * *